United States Patent [19]

Souders

[11] Patent Number: 5,441,675

[45] Date of Patent: Aug. 15, 1995

[54] FORMING METHOD AND APPARATUS

[75] Inventor: Steven L. Souders, Portsmouth, N.H.

[73] Assignee: Davidson Textron, Inc., Dover, N.H.

[21] Appl. No.: 147,934

[22] Filed: Nov. 1, 1993

[51] Int. Cl.⁶ .................. B29C 33/02; B29C 33/43; B29C 43/02

[52] U.S. Cl. .................. 264/25; 264/321; 264/322

[58] Field of Search .............. 264/25, 37, 320, 321, 264/322

[56] References Cited

U.S. PATENT DOCUMENTS

| | | | |
|---|---|---|---|
| 4,162,877 | 7/1979 | Nyberg | 425/84 |
| 4,263,007 | 4/1981 | Battigelli et al. | 425/371 |
| 4,462,785 | 7/1984 | Smith | 425/387.1 |
| 4,689,004 | 8/1987 | Kunkel | 425/407 |
| 4,786,351 | 11/1988 | Elliott et al. | 156/245 |
| 4,850,849 | 7/1989 | Hsu | 425/407 |
| 4,923,555 | 5/1990 | Elliott et al. | 156/497 |
| 5,096,409 | 3/1992 | Stofko | 425/405.1 |

*Primary Examiner*—Leo B. Tentoni
*Attorney, Agent, or Firm*—Reising, Ethington, Barnard And Perry

[57] ABSTRACT

The molding apparatus includes a press (10) with a top mold (12) and a bottom mold (14). The top mold (12) has a die (32) with a contoured die surface (34) and gas passages (36). The bottom mold (14) has a die (44) with a contoured die surface (46). The die (44) is made from either a solid piece of material with gas passages or from a porous material. During operation, a workpiece (26) is placed in a mold cavity (24). The mold cavity (24) is closed to shape the workpiece. The workpiece is heated by hot gas supplied by a gas supply and recirculation system (52) when the diverter valves (68 and 70) are opened and gas flows from gas circulation fan (56) to the gas heater chamber (54) to the bottom mold (14), through the die (44), through the workpiece (26), through the die (32) and back to the inlet side of the gas circulation fan (56). When the workpiece (26) has been heated to the desired temperature for the required time, the diverter valves (68 and 70) are closed. When the diverter valves are closed, gas flows through the gas recirculation duct (62) from the gas heater chamber (54) to the inlet of the gas circulation fan (56). The mold cavity (24) is then opened and the workpiece (26) is removed and an unformed workpiece is placed in the mold cavity to repeat the cycle.

5 Claims, 3 Drawing Sheets

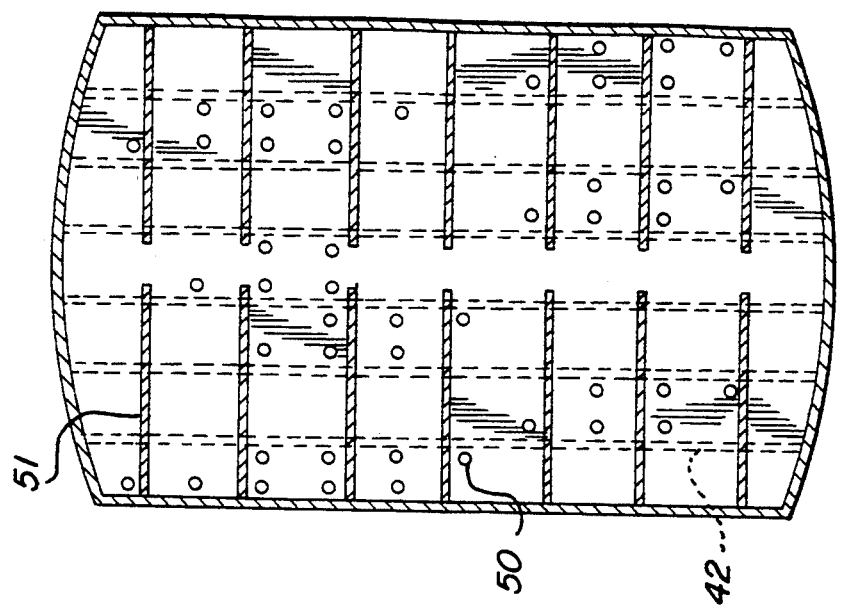
FIG-4
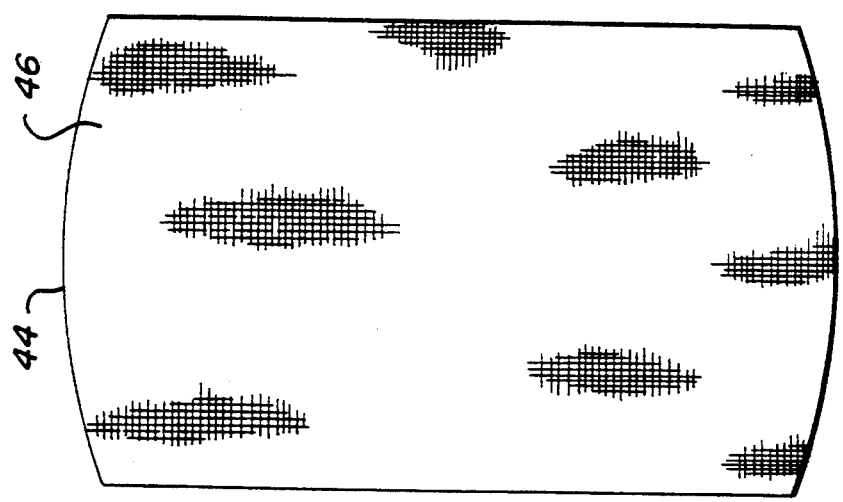
FIG-3
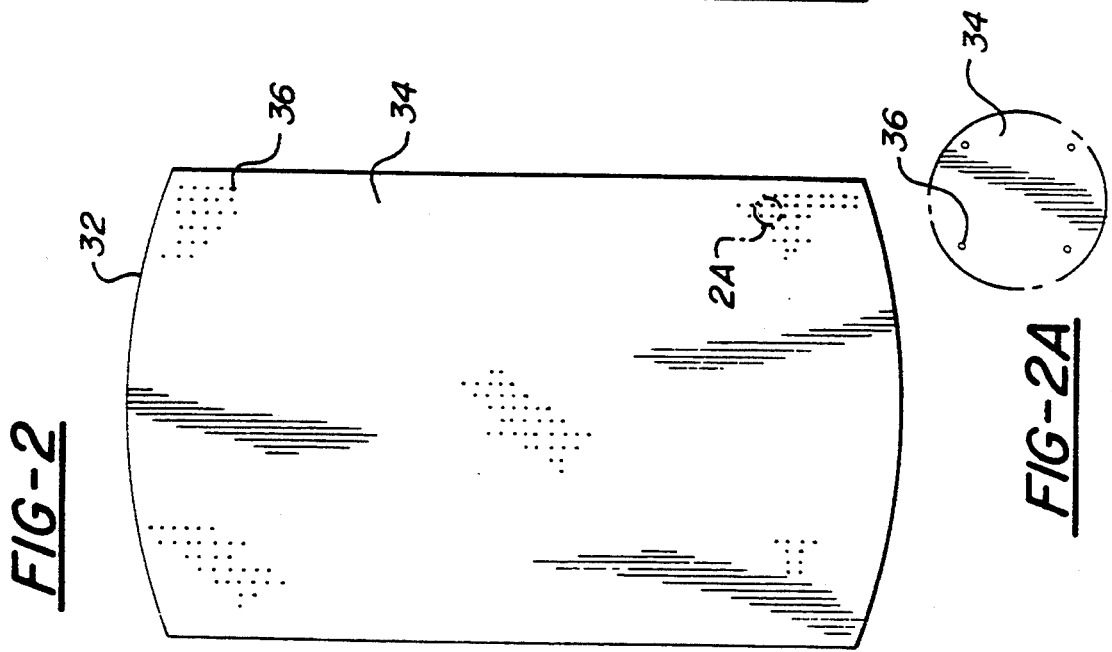
FIG-2
FIG-2A

FORMING METHOD AND APPARATUS

BACKGROUND OF THE INVENTION

1. Field Of The Invention

This invention relates to a method and apparatus for forming a workpiece by pressing the workpiece in a mold and passing a hot gas through the workpiece and more particularly to forming an automotive headliner by shaping the headliner between dies and then passing a hot gas through the dies and the headliner.

2. Description Of The Prior Art

Automotive headliners, fabric with a foam backing, fibers mixed with adhesive materials and other similar articles have been formed by placing the material from which the articles are made in a mold cavity of the desired shape and then passing super heated steam through the articles to activate an adhesive or to soften thermally softenable materials and cause the materials from which the articles are made to adhere to each other. Such articles have also been formed by passing a heated gas through the article rather than super heated steam.

Super heated steam can in some cases result in condensation of water on the surface of an article that has been formed. The water can discolor or stain the article and may change the surface texture. Another problem that is frequently encountered is delamination of the article. Delamination may be caused by water or it can be caused by an expansion of the gas inside the article due to pressure differentials between the gas inside the article and the pressure on the outside surface of the article. A further problem is energy loss. Superheated steam is released during molding and is very difficult to recapture. The energy required to heat the steam is lost with the steam.

A number of the article forming processes employing super heated steam, that are currently used, treat the article with a cooling gas after the steam treatment to reduce the temperature of a workpiece and rigidify thermoplastic material if used. The cooling gas treatment forces water out and reduces the problems mentioned above. However, the cooling gas treatment increases cost and increases the time required to form each article even when the forming operation is continuous.

The article forming systems employing heated gas that have been used tend to be slow due to the time required to heat the gas. It takes time to heat gasses. It may also be difficult to control the temperature of the gasses during heating. Depending on the materials used to make the article being formed, temperature control may be critical.

Energy is required to heat steam and to heat gas. The systems currently used to form an article in a mold cavity by passing steam or hot gas through the article all require substantial amounts of energy. These systems do not recapture gas, steam or the energy required to heat the steam or gas. Increases in energy costs increase the cost of producing articles by processes that use substantial amounts of energy.

SUMMARY OF THE INVENTION

An object of the invention is to form articles by compressing a workpiece and then treating the workpiece with hot gas, with a short cycle time for each article produced.

Another object of the invention is to provide an apparatus and method, for forming a workpiece with a hot gas, that recycles gas and a portion of the energy required to heat the gas.

A further object of the invention is to provide an apparatus and method for forming a workpiece with pressure and a hot gas which requires minimal energy.

The apparatus for thermally forming a workpiece includes a press with a top mold and a bottom mold. The top mold includes a die with the desired shape to form a workpiece. The top die has a large number of small gas passages for the passage of hot gas. The bottom mold includes a die with the desired shape to form a workpiece. The bottom mold can be a solid plate with a large number of small gas passages for the passage of hot gas like the top die or it can be a porous plate made from a woven metal, a porous material, sintered metal or some other similar structure. Both of the molds are vertically movable to move the dies toward each other or to move the dies apart. The dies are moved together to form a mold cavity between them. The top and bottom molds are moved apart for removal of a completed workpiece and for loading a new workpiece that is to be formed in the mold cavity.

A hot gas is passed through the two dies and the compressed workpiece to activate material in the workpiece and to fix the shape of the workpiece. The hot gas supply and recirculation system includes a gas heater chamber and a gas circulating fan. The gas circulating fan outlet supplies gas to the gas heater chamber through a gas supply duct. Hot gas from the gas heater chamber is returned to the gas circulation fan through a gas recirculation duct when a workpiece is not being treated. The gas circulation fan runs continuously to provide a continuous supply of hot gas. By insulating the ducts and chambers, heat loss is minimal and gas temperature can be accurately controlled.

To treat a workpiece with hot gas a hot gas diverter valve is opened and hot gas from the gas heater chamber is supplied to the bottom mold by a hot gas supply duct. A cold gas diverter valve is also opened to treat a workpiece with a hot gas. The cold gas diverter valve supplies cold gas from the top mold to the gas circulation fan through a cold gas return duct. Manifolds and baffles are provided in the bottom mold and in the top mold to control the flow of hot gas through a workpiece. The gas is in a closed system when it is treating a workpiece as well as when the hot gas and cold gas diverter valves are closed and gas passes through the gas recirculation duct from the gas heater chamber to the gas circulation fan. However, the mold cavity is not sealed when a workpiece is being treated with hot gas. Because the mold cavity is not sealed make up air can be drawn in and excess air, if any, can be expelled.

A workpiece that is to be formed is placed between the top and bottom molds. The top and bottom molds are closed to form a mold cavity that shapes the workpiece. Hot gas is diverted from the continuous flow of hot gas supply and recirculation system to the molds where it passes through the workpiece. After the workpiece is heated to the required temperature, the flow of gas through the workpiece is discontinued and flow through a gas recirculation duct is resumed. The top and bottom molds are separated and the workpiece is removed. The mold is then ready to receive a new workpiece that is to be formed.

The foregoing and other objects, features and advantages of the present invention will become apparent in the light of the following detailed description of an exemplary embodiment thereof, as illustrated in the accompanying drawing.

DESCRIPTION OF THE DRAWING

FIG. 2 is a bottom view of the top mold die taken along line 2—2 FIG. 1;

FIG. 2A is an enlarged view of a portion of the die shown in FIG. 2;

FIG. 3 is a top view of an alternate bottom die taken along line 3—3 in FIG. 1;

FIG. 4 is a sectional view of the bottom mold taken along line 4—4 in FIG. 1.

DESCRIPTION OF THE PREFERRED EMBODIMENT

Figure 1:
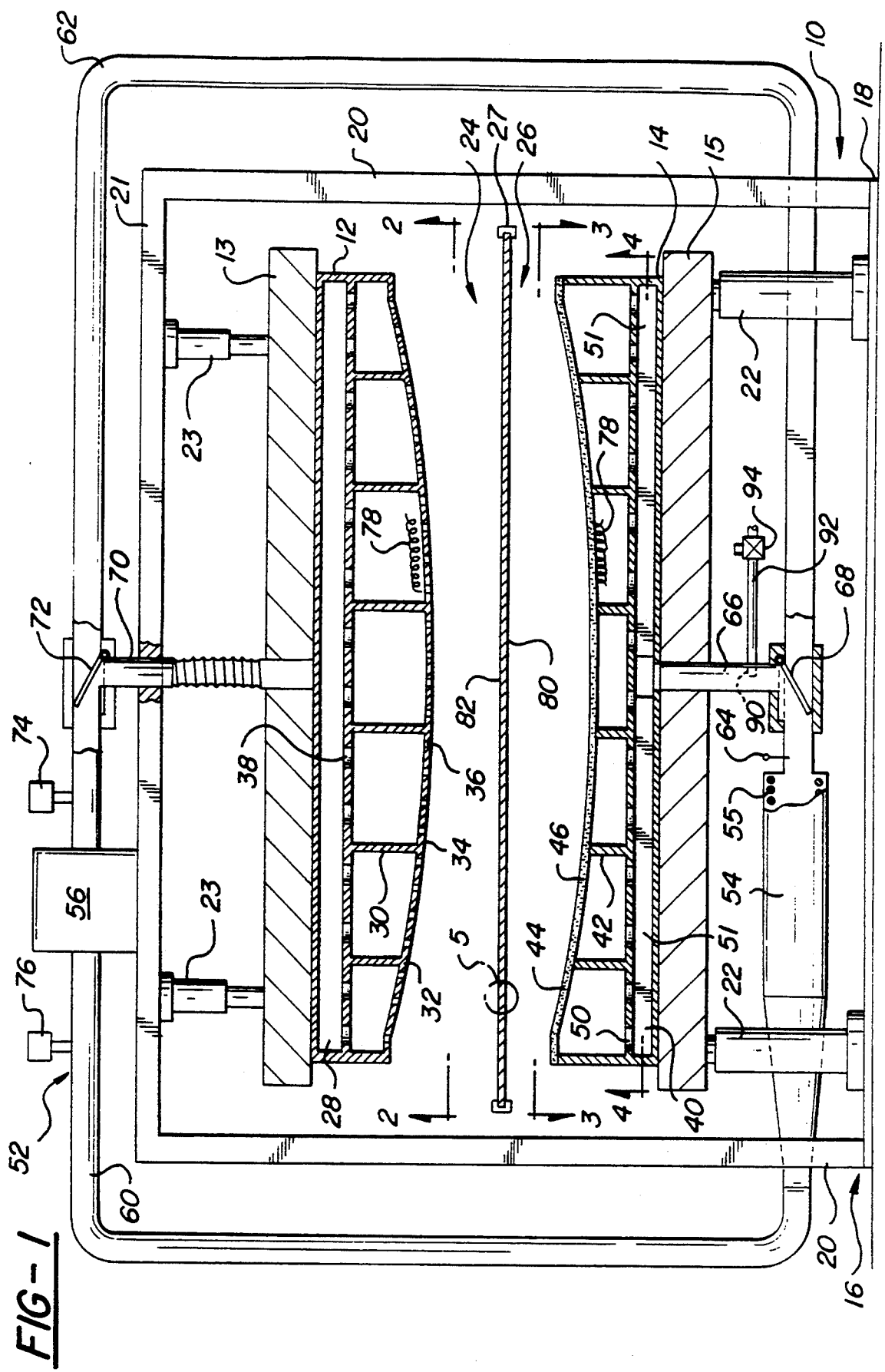
FIG. 1 is a front vertical sectional view of a press with molds, dies and a hot gas supply and recirculation system that is shown schematically in part and with parts broken away.

The apparatus for thermally forming a workpiece includes a press 10 with a top mold 12 and a bottom mold 14. The top mold 12 is supported by a vertically moveable press platen 13 attached to a frame 16. The frame 16 has a base 18, supports 20 and a top 21. The top press platen 13 is attached to the top 21 of the frame 16 by a plurality of hydraulic cylinders 23. The bottom mold 14 is supported by a movable press platen 15 mounted on the base 18 by a plurality of hydraulic cylinders 22 which move the bottom mold 14 vertically. The bottom mold 14 is raised and the top mold 12 is lowered to compress a workpiece in a mold cavity 24 formed between the top die 32 and the bottom die 44. The hydraulic cylinders 22 and 23 can also change the volume of the mold cavity if required. The bottom mold 14 is lowered and the top mold 12 is raised to open the mold cavity 24, as shown in FIG. 1, to remove a formed workpiece. While the bottom mold 14 is in a lowered open position and the top mold 12 is in a raised open position, the material or materials that form a workpiece 26 that is to be formed and treated can be loaded into the open mold cavity.

Both the top and bottom molds 12 and 14 are vertically movable to open and close the mold cavity 24. It would be possible to hold one mold 12 or 14 in a fixed position and to move the other mold vertically to open and close the mold cavity 24. It would also be possible to mount the top mold 12 or the bottom mold 14 on a hinge and pivot the mold to open and closed the mold cavity 24.

The workpiece 26 or a portion of the workpiece is held around its periphery by a tenter frame 27. The tenter frame 27 loads a workpiece 26 into the open mold cavity 24 for molding and removes the workpiece from the open mold cavity after molding. The workpiece 26 is held on a centerline between the platens 13 and 15 and the dies 34 and 44 by the tenter frame 27. By moving the upper mold 12 and the lower mold 14 vertically toward each other to close the mold cavity 24 and away from each other to open the mold cavity, the tenter frame 27 can hold the workpiece in a fixed position between the dies 34 and 44. If one mold 12 or 14 is fixed, the tenter frame 27 would have to be vertically moveable.

The top mold 12 has a gas manifold 28, gas distribution baffles 30 and a die 32. The die 32 is an aluminum block that has been formed by a press or by machining to provide a die surface 34 with the desired surface profile to form a workpiece 26. The die 32 has gas passages 36 on one inch centers with a diameter of 0.0625 inches that receive gas that has passed through a workpiece 26. Gas that passes through the gas passages 36 is directed by the baffles 30 and passes through ports 38 into the gas manifold 28.

The bottom mold 14 has a gas manifold 40, gas distribution baffles 42 and a bottom die 44. The gas manifold 40 includes baffles 51, shown in FIGS. 1 and 4, which divide the manifold into eight compartments. The number of compartments formed by the baffles 51 in the gas manifold 40 can be increased or decreased to obtain the desired gas flow through each portion of the workpiece 26. The number of baffles 42 can also be varied to improve gas distribution. A gas flow control system (not shown) controls the delivery of hot gas into each of the eight compartments. The die 44 can be an aluminum plate that has a die surface 46 with the desired surface profile to form a workpiece 26 and gas passages (not shown) like the gas passages 36 in the die 32. The die 44 can also be made from a porous material, sintered metal, or a woven metal sheet, as shown in FIG. 3, that facilitates the passage of gas. Gas from the compartments in the manifold 40 passes through ports 50 and is directed by gas distribution baffles 42 to the die 44 made from a porous material or to gas passages like the gas passages 36 in the top die 32. The gas which passes through the bottom die 44 passes through the workpiece 26 and through the top die 32.

A hot gas supply and recirculation system 52 is provided to supply hot gas to the gas manifold 40 and to suck gas from the gas manifold 28, The gas used in the molding apparatus is clean air, The hot gas supply and recirculation system 52 includes a gas heater chamber 54 and a gas circulation fan 56, The gas heater chamber 54 can use electric heating elements 55 or other heat sources to heat gas in the chamber, The heat source has the capability of heating gas to over 700° F. The gas circulation fan 56 supplies gas to the gas heater chamber 54 through a gas supply duct 60 that is connected to the outlet of the gas circulation fan 56 and to the inlet of the gas heater chamber 54. The outlet of the gas heater chamber 54 is connected to a gas recirculation duct 62. The gas recirculation duct 62 is also connected to the inlet of the gas circulation fan 56 to form a continuous closed gas circulation loop. A temperature probe 64 is provided near the outlet of the gas heater chamber 54 to control the heater elements 55 in the gas heater chamber 54 and thereby control the temperature of gas leaving the gas heater chamber. A gas supply duct 66 is connected to the outlet of the gas heater chamber 54 and to the gas manifold 40 of the bottom mold 14. The gas supply duct 66 accommodates vertical movement of the bottom mold 14. A diverter valve 68 is provided in the outlet of the gas heater chamber 54 to direct hot gasses from the gas heater chamber 54 to the gas recirculation duct 62 or into the gas supply duct 66. A gas return duct 70 is connected to the gas manifold 28 of the top mold 12 and to the inlet of the gas circulating fan 56. The gas return duct 70 accommodates vertical movement of the upper mold 12. A second diverter valve 72 is provided to direct gas from the gas recirculation duct 62 into the inlet of the gas circulation fan 56 or direct gas from the gas return duct 70 into the inlet of the gas circulation fan 56.

The two diverter valves 68 and 72 close the gas manifold 40 and the gas manifold 28 to minimize the loss of hot gas from the top mold 12 and from the bottom mold 14 when the mold chamber 24 is open and a workpiece 26 is not being treated by hot gas from the gas heater chamber 54. By reducing the loss of hot gas, the energy required to heat the gas is reduced.

The gas circulating fan 56 is designed to circulate gas rather than to compress gas. There is however, a small pressure increase across the gas circulation fan 56. The pressure drop created by the gas circulation fan 56 results in a lower pressure in the gas manifold 28 of the top mold 12 than in the gas manifold 40 of the bottom mold 14. The pressure differential forces hot gas through the die 44, the workpiece 26 and the die 34. The pressure differential is small. The pressure of gas in the workpiece 26 is close to atmospheric pressure. The low pressure prevents delamination problems in the workpiece 26 and reduces the loss of hot gas from the hot gas supply system 52. A relief valve 74 can be provided on the inlet side of the gas circulation fan 56 to prevent an excessive suction in the gas manifold 28 and the gas recirculation duct. A relief valve 76 can be provided on the outlet side of the gas circulation fan 56 to prevent an excessive pressure in the gas supply ducts 60, the gas heater chamber 54 and the gas manifold 40 in the bottom mold. However, relief valves 74 and 76 are not generally required. The mold cavity 24 is not sealed when a workpiece 26 is being treated. Make up air can be drawn in and excess air can be expelled.

Electric heater elements 78 are attached to the dies 32 and 44 to maintain their temperature just below the temperature required to set the workpiece 26. The hot gas from the gas heater chamber 54 is used to accelerate the molding process and reduce cure time.

Figure 5:
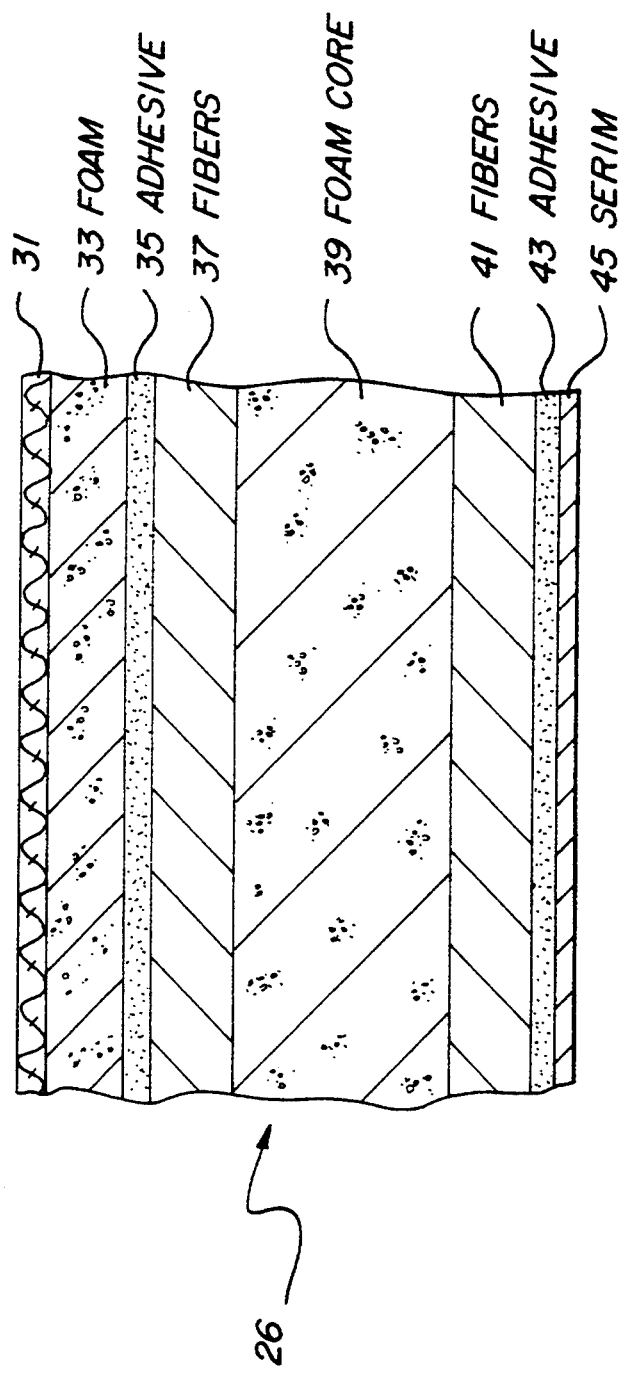
FIG. 5 is a schematic view of the material which may make up a workpiece to be formed between the dies and cured by a hot gas.

Forming a workpiece 26 in a mold cavity 24 normally starts with placing the materials for making the workpiece 26 in a tenter frame 27 and placing the tenter frame on a centerline between the platens 13 and 15. The workpiece 26 can be made from a variety of materials. It can, for example, be a thermal setting foam 80 and fabric material 82 as shown in FIG. 1. An adhesive could also be included if required to join the foam 80 and the fabric 82 if they are not already joined to each other. FIG. 5 shows an example of the materials which can be employed to create a workpiece 26 that forms an automotive headliner. This particular workpiece 26 includes a fabric face 31, a laminated polyurethane foam 33, a web adhesive 35, chopped glass fibers 37, polyurethane or urea foam core 39, chopped glass fibers 41, an adhesive film 43, and non woven scrim 45. The workpiece 26, as shown in FIG. 5, could be modified by adding additional materials, eliminating some of the materials, and by changing the order of the materials. The fabric face 31 and the laminated polyurethane foam 33 are placed in the tenter frame. The tenter frame 27 removes any wrinkles and keeps the fabric face 31 smooth and wrinkle free. The web adhesive 35, chopped glass fibers 37, foam core 39, glass fibers 41, adhesive film 43 and nonwoven scrim 45 and other materials if any can be placed on the bottom die 44. After all the materials that form the workpiece 26 are in place between the bottom mold 14 and the top mold 12, the cylinders 22 raise the bottom mold and the cylinders 23 lower the top mold to form a closed mold cavity 24 between the top die 32 and the bottom die 44. This normally compresses the workpiece 26. The dies 32 and 44 are heated and maintained at a predetermined temperature by heater elements 78 before the workpiece 26 is inserted and before the top mold 12 is lowered and the bottom mold 14 is raised to form the closed mold cavity 24. The predetermined temperature is below the temperature required to melt and set the thermosetting components of the workpiece 26. The temperature of the top and bottom dies 32 and 44, maintained by the heater elements 78, can be adjusted up or down as required to accommodate a workpiece 26 made from materials with different properties. With one group of materials that has been used, a temperature of 300° F. for the dies 32 and 34 works well.

Hot gasses which have been circulating through the gas circulation fan 56, the gas supply duct 60, the gas heater chamber 54 and the gas recirculation duct 62 are diverted from the gas heater chamber 54 through a gas supply duct 66 to the manifold 40 by a diverter valve 68 after the mold cavity 24 is closed. The inlet side of the gas circulation fan 56 is connected to the gas return duct 70 and the gas manifold 28 by the diverter valve 72. This creates a pressure drop across the mold cavity 24 which causes hot gas to pass through the ports 50 and into a chamber filled with baffles 42. The hot gas then passes through the gas passages through the die 44. The hot gas then passes through the workpiece 26 and raises the temperature of the workpiece 26 to the required temperature to melt and set the thermo plastic material. The temperature required can vary depending on the material in the workpiece 26. A temperature of about 500° F. is satisfactory for treating the materials commonly used to form automotive headliners. The temperature can be increased to over 700° F. if required. Gas that has passed through the workpiece 26 is sucked through the gas passages 36 in the die 32 and into chambers formed by baffles 30. The gas in the chambers formed by the baffles 30 passes through ports 38 and into the gas manifold 28. Gas passes through the return ducts 70 to the inlet or suction side of the gas circulation fan 56. The gas circulation fan 56 recirculates the gas received from the gas manifold 28 back to the gas heater chamber 54. The volume of the mold cavity 24 is adjusted by raising or lowering the top mold 12 and bottom mold 14 with hydraulic cylinders 22 and 23. The diverter valves 68 and 72 are shifted to divert the hot gas from the gas heater chamber 54 into the gas recirculation duct 62 and to close the inlet to the gas manifold 40 and outlet from the gas manifold 28 as soon as the workpiece has been heated to the desired temperature for the required time.

The top mold 12 is raised and the bottom mold 14 is lowered by the hydraulic cylinders 22 and 23 to open the mold cavity 24. The formed workpiece 26 which is held by the tenter frame 27 is removed from the open mold cavity 24. After the formed workpiece is removed, the open mold cavity 24 is ready to receive the materials that constitute a workpiece 26 that is to be formed and heated.

Known systems for forming a workpiece 26 like an automotive headliner employ a catalyst that is added to the workpiece before the workpiece is compressed in a mold cavity 24. The catalyst accelerates the reaction time to stiffen the workpiece thereby reducing cycle time. In hot weather the catalyst can react prematurely and stiffens the workpiece before the workpiece is shaped in the mold chamber 24. By using hot gas to cure a workpiece 26, the catalyst can be reduced without an unacceptable increase in cure time. Reducing the catalyst in hot weather reduces the occurrence of premature reactions. The use of hot air with the catalyst, when ambient temperatures will not cause a premature reaction, reduces cure time and increases productivity. The temperature in the center of the workpiece can be raised to the optimum temperature faster with a hot gas such as air than when it is raised with super heated steam. The temperature in the workpiece can also be raised to a higher temperature with hot air than with super heated steam in a low pressure system.

The workpiece forming procedure and the apparatus for carrying out the procedure, described above are for forming and curing a workpiece 26 with components that are formed, laminated and cured by pressure and heat. Automotive headliners and other articles are also manufactured using components such as adhesives 35 and 43 that require water in addition to pressure and heat. The molding apparatus described above will perform well when forming a workpiece 26 that requires water to activate adhesives such as adhesives 35 and 43 or other components of a work piece 26. Water can be provided by adding a nozzle 90 inside the gas supply duct 66. The nozzle 90 is connected to and supported by a water supply pipe 92 inside the gas supply duct 66. The water supply pipe 92 passes through a wall of the gas supply duct 66 and is connected to a source of water (not shown) under pressure. A control valve 94 is the water supply pipe 92 meters the supply of water to the nozzle 90 and discontinues the flow of water when it is not needed. Water that is prayed from the nozzle 90 is immediately turned to a gas when it is sprayed into a stream of hot gas from the gas heater chamber 54. The hot gas from the gas heater chamber 54 turns the water spray into a gas. When sufficient water has been supplied to activate the materials in the work piece 26 that require water, the control valve 94 is closed and the flow of water is stopped until water is again required to treat another workpiece.

The spraying of water into a stream of hot air at or near atmospheric pressure is more efficient than using superheated steam. Steam must be heated to a high temperature to accommodate the temperature drop that occurs when the pressure decreases to atmospheric pressure.

Preferred embodiments of the invention have been described in detail, but are examples only and the invention is not restricted thereto. It will be easily understood by those skilled in the art that modifications and variations can easily be made within the scope of this invention.

I claim:

1. A method of forming a workpiece in a mold cavity between a top mold, with a formed top die and a gas manifold, and a bottom mold, with a formed bottom die and a gas manifold, and a gas heater chamber including:
   a. placing an unformed workpiece between the top and bottom dies;
   b. closing the mold cavity to form the workpiece;
   c. supplying hot gas from the gas heater chamber to one of the gas manifolds for passage through the workpiece and into the other gas manifold;
   d. returning the gas from the other gas manifold to the gas heater chamber for reheating and recirculation through the mold cavity;
   e. discontinuing the flow of gas through the workpiece after the workpiece has been heated to a temperature required to treat the workpiece;
   f. continuously recirculating gas through the gas heater chamber in a closed circuit when the supply of hot gas to the workpiece is discontinued;
   g. opening the mold cavity; and
   h. removing the formed workpiece from between the top mold and the bottom mold after the mold cavity is opened.

2. A method of forming a workpiece, as set forth in claim 1, including preheating the top die and the bottom die.

3. A method of forming a workpiece, as set forth in claim 2, wherein the top die and the bottom die are preheated to a temperature below the temperature required to melt a component of the workpiece.

4. A method of forming a workpiece, as set forth in claim 1, including discontinuing the flow of gas into the gas manifold of the bottom mold and out of the gas manifold of the top mold, to discontinue the flow of gas through a workpiece after the workpiece has been heated for the time required to treat the workpiece.

5. A method of forming a workpiece, as set forth in claim 1, including supplying water to the hot gas from the gas heater chamber for passage with the hot gas into the workpiece.

* * * * *